United States Patent
Inoue et al.

(10) Patent No.: US 6,618,349 B2
(45) Date of Patent: Sep. 9, 2003

(54) OPTICAL RECORDING MEDIUM AND ITS DESIGNING METHOD

(75) Inventors: Hiroyasu Inoue, Tokyo (JP); Hajime Utsunomiya, Tokyo (JP); Hiroshi Shingai, Tokyo (JP); Tetsuro Mizushima, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/788,589

(22) Filed: Feb. 21, 2001

(65) Prior Publication Data

US 2001/0021161 A1 Sep. 13, 2001

(30) Foreign Application Priority Data

Feb. 21, 2000 (JP) .................. 2000-042953
Oct. 10, 2000 (JP) .................. 2000-309955
Jan. 23, 2001 (JP) .................. 2001-014600

(51) Int. Cl.⁷ .................................. G11B 7/00
(52) U.S. Cl. ...................... 369/275.4; 369/111
(58) Field of Search ............... 369/275.4, 275.3, 369/275.5, 277, 278, 279, 111, 44.26, 13.38, 13.54, 13.55

(56) References Cited

U.S. PATENT DOCUMENTS 5,504,734 A * 4/1996 Morita .................. 369/275.4
5,694,379 A * 12/1997 Aratani et al. .......... 369/275.4
6,487,163 B1 * 11/2002 Sugaya et al. .......... 369/275.4

FOREIGN PATENT DOCUMENTS

| EP | 1039451 A2 | * 9/2000 |
| JP | 2697555 | 9/1997 |
| JP | 11-7658 | 1/1999 |

* cited by examiner

Primary Examiner—Thang V. Tran
(74) Attorney, Agent, or Firm—Oblon, Spivak, McClelland, Maier & Neustadt, P.C.

(57) ABSTRACT

In an optical recording medium of land/groove recording system, a sufficient tilt margin and a reduced cross talk are realized simultaneously with a sufficiently increased output. Provided is an optical recording medium having a light-transmitting substrate formed with grooves wherein the grooves and the region between adjacent grooves are used for the recording track, and a reading beam is irradiated through the light-transmitting substrate, wherein the relations:

$$-12.6T+15.6 \leq x \leq 25T-3.8, \text{ and}$$

$$0.55 \leq T \leq 0.68$$

are satisfied when the reading beam has a wavelength of $\lambda$, the light-transmitting substrate has a refractive index at the wavelength $\lambda$ of n, the reading optical system has a numerical aperture of NA, recording track pitch is $P_T$, the groove has a depth of $\lambda/(x \cdot n)$, and T is $P_T/(\lambda/NA)$.

4 Claims, 1 Drawing Sheet

RECORDING/READING BEAM

RECORDING/READING BEAM

RECORDING/READING BEAM

OPTICAL RECORDING MEDIUM AND ITS DESIGNING METHOD

BACKGROUND OF THE INVENTION

1. Field of the Invention

This invention relates to an optical recording medium and its designing method.

2. Prior Art

Highlight is recently focused on optical recording media capable of recording information at a high density and erasing the recorded information for overwriting. One typical overwritable optical recording medium is phase change optical recording medium wherein the recording layer is irradiated with a laser beam to change its crystalline state whereupon a change in reflectivity caused by the change of the crystalline state is detected for reading of the information. The phase change optical recording media are of great interest since the medium can be overwritten by modulating the intensity of a single laser beam and the optical system of the drive unit is simple as compared to magnetooptical recording media.

When information is recorded on the optical recording medium of phase change type, the entire recording layer is typically first brought into crystalline state, and then, a laser beam of high power (recording power) is applied so that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallization temperature and lower than the melting temperature. The record mark to which the laser beam of erasing power is applied is heated to a temperature higher than the crystallization temperature and then allowed to slowly cool to recover the crystalline state. Accordingly, in the optical recording media of phase change type, the medium can be overwritten by modulating the intensity of a single light beam.

The recording layer of phase change type is most often constituted from a material of Ge—Sb—Te system or Ag—In—Sb—Te system which provides a substantial difference in reflectivity between the crystalline and the amorphous states as well as a relatively stable amorphous state.

In the phase change optical recording medium, grooves (guide grooves) are generally provided on the light-transmitting substrate for the purpose of tracking, and the grooves often carry address information. It has been commonplace in the past to form record marks either in the groove or in the area between adjacent grooves (land). However, land/groove recording wherein both the groove and the land are used for the recording track has been recently proposed in order to reduce the recording track pitch and enable high density recording. However, when the recording track pitch is reduced in the medium wherein the land/groove recording is conducted, beam spot of the laser beam used for the recording and reading will extend into the adjacent track, and this invites increased cross talk in the reading.

In view of such situation, Japanese Patent No. 2697555 proposes use of a medium wherein the land and the groove have a substantially same width and the groove has a depth in optical length of $\lambda/7$ to $\lambda/5$ to thereby reduce the cross talk in the land/groove recording provided that $\lambda$ is the wavelength of the reading beam. Japanese Patent No. 2697555 also discloses that the cross talk is minimized when the groove has a depth in optical length of $\lambda/6$. Japanese Patent Application Laid-Open No. (JP-A) 7658/1999 discloses that the cross talk is minimized in the land/groove recording when the groove has a depth in optical length of $\lambda/6$ to $\lambda/3$. As a matter of fact, the groove depth of the commercialized DVD-RAM is 70 nm (optical length of approximately $\lambda/6$).

Another effective countermeasure which may be taken for high density recording is use of a recording/reading laser beam with a smaller beam spot. The beam spot diameter is generally represented by $\lambda/NA$ when the laser beam has a wavelength $\lambda$ and the objective lens of the recording/reading optical system has a numerical aperture NA. Therefore, the beam spot diameter can be reduced either by reducing the wavelength of the recording/reading beam or by increasing the NA. For example, when DVD is compared to CD, the recording capacity of DVD (4.7 GB/side) is 6 to 8 times larger than that of the CD and such recording capacity is realized by reducing the wavelength of the recording/reading beam from 780 nm to 650 nm and increasing the NA from 0.45 to 0.6.

Use of such high NA, however, invites decrease in tilt margin. Tilt margin is tolerance for the tilting of the medium in relation to the optical system, and the tilt margin is determined by the NA. When the recording/reading beam enters the recording layer through a light-transmitting substrate and exits the medium again through the light-transmitting substrate and the light-transmitting substrate has a thickness t, the tilt margin is proportional to $$\lambda/(t \cdot NA^3)$$

It might be ideal that the surface of the medium is perpendicular to the direction of the recording/reading beam entrance. However, the surface is actually tilted from such ideal state. Lapse of time may also result in the deformation such as warping of the medium, and such deformation may result in the alteration of the tilt angle of the medium surface. Since increase in the jitter is invited when the medium is not accurately perpendicular to the recording/reading beam, widening of the tilt margin is quite important in practical point of view. It is also possible to provide a tilt sensor on the drive unit for feed back control. Such provision, however, is unpreferable in view of the increased cost.

SUMMARY OF THE INVENTION

In spite of the situation as described above, no proposal has so far been made for an optical recording medium of land/groove recording system wherein a sufficiently broad tilt margin has been realized at the same time with a sufficiently reduced cross talk. Investigation of the inventors of the present invention has also revealed that designing of a medium with the emphasis on the decrease of the cross talk may result in an insufficient output, and hence, in unduly increased jitter.

An object of the present invention is to provide an optical recording medium of land/groove recording system wherein a sufficient tilt margin and a reduced cross talk are realized simultaneously with a sufficiently increased output.

Such objects are attained by the present invention as described in (1) to (4), below.

(1) An optical recording medium having a light-transmitting substrate formed with grooves wherein the grooves and the region between adjacent grooves are used for the recording track, and a reading beam is irradiated through the light-transmitting substrate, wherein the relations:

$$-12.6T+15.6 \leq x \leq 25T-3.8, \text{ and}$$

$$0.55 \leq T \leq 0.68$$

are satisfied when the reading beam has a wavelength of λ, the light-transmitting substrate has a refractive index at the wavelength of n, the objective lens which is used in the reading optical system has a numerical aperture of NA, recording track pitch is $P_T$, the groove has a depth of λ/(x·n), and T is $P_T/(λ/NA)$.

(2) An optical recording medium according to the above (1) wherein said medium is used in combination with a reading optical system wherein $$NA \geq 0.6.$$

(3) A method for designing an optical recording medium having a light-transmitting substrate formed with grooves wherein the grooves and the region between adjacent grooves are used for the recording track, and a reading beam is irradiated through the light-transmitting substrate, wherein the groove is designed to have a depth satisfying the relations:

$$-12.6T+15.6 \leq x \leq 25T-3.8, \text{ and}$$

$$0.55 \leq T \leq 0.68$$

when the reading beam has a wavelength of λ, the light-transmitting substrate has a refractive index at the wavelength λ of n, the objective lens which is used in the reading optical system has a numerical aperture of NA, recording track pitch is $P_T$, the groove has a depth of λ/(x·n), and T is $P_T/(λ/NA)$.

(4) A method for designing an optical recording medium according to the above (3) wherein the medium is designed by assuming that:

$$NA \geq 0.6.$$

DETAILED DESCRIPTION OF THE INVENTION

Figure 1:
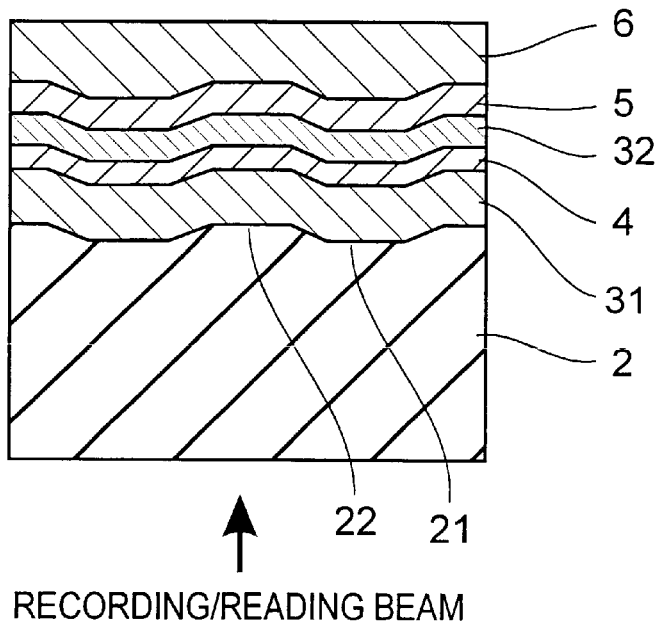
FIG. 1 is a cross sectional view of the optical recording medium according to an embodiment of the present invention.

In the present invention, the value x defining the groove depth λ/(x·n) is limited by using the T, namely, the ratio of the recording track pitch PT to the beam spot diameter λ/NA of the reading beam, and the value T is simultaneously limited to a certain range. This enables production of an optical recording medium of land/groove recording system wherein the tilt margin is sufficiently widened and the cross talk is sufficiently reduced, and also, wherein the output is sufficiently increased.

In the present invention, the relations:

$$-12.6T+15.6 \leq x \leq 25T-3.8, \text{ and}$$

$$0.55 \leq T \leq 0.68$$

are satisfied, and preferably, the relation:

$$0.55 \leq T \leq 0.66$$

is further satisfied. The reason for limiting the x to the range as described above is as described below. When T is within the range as described above, x below the above-described range results in critically reduced output, and consequently, in the unduly poor jitter whereas x in excess of the above-described range results in a critical, rapid increase of the cross talk.

The reason for limiting the range of x by a linear relation of T is as described below. It should be noted that, in the following description, ratio T of the recording track pitch in relation to the beam spot diameter is referred to as the relative track width.

First, upper limit of the x has been determined for the purpose of reducing the cross talk to below certain level. The cross talk increases with the decrease in the relative track width while it reduces with the increase in the depth of the groove when the groove depth is less than λ/6n. Therefore, the cross talk can be suppressed to below certain level by reducing x (by increasing the depth of the groove) when T is small, and by increasing x (by reducing the depth of the groove) when T is large. The inventors of the present invention have conducted a number of experiments to determine the relationship between T and x that is required for reducing the cross talk, and found that the cross talk can be reduced by satisfying the relation:

$$x \leq 25T-3.8.$$

On the other hand, lower limit of the x has been determined for the purpose of securing a sufficient output. The output reduces with the decrease in the relative track width T to invite increase in the jitter while the output increases with the decrease in the groove depth. Therefore, sufficient output should be secured by increasing x (by reducing the depth of the groove) when T is small, and x can be small (the groove may be deep) when T is large. The inventors of the present invention have conducted a number of experiments to determine the relationship between T and x that is required for reliably producing the sufficient output, and found that the cross talk can be reduced by satisfying the relation:

$$-12.6T+15.6 \leq x.$$

Next, the reason is described for the limitation of the range of T.

When T is below the range as described above, namely, when the beam spot extends beyond the recording track to a considerable degree, increase in the cross talk and decrease in the tilt margin will be invited. Also likely to be invited is the phenomenon wherein recording in the particular track is associated with the erase of the record marks in the adjacent track (the phenomenon also called cross erase).

On the other hand, when T is large, and accordingly, when the beam spot only extends beyond the recording track to a limited degree, tracking servo stability may become insufficient, and in particular, tracking servo stability is likely to be insufficient when a high linear velocity is employed. In addition, when T is in excess of the range as described above, the recording density of the medium will not be fully increased in relation to the size of the beam spot used, and in other words, the available resource will not be fully exploited. In the present invention, the merit of the invention becomes significant when the recording density is increased to its upper limit in relation to the beam spot available.

As described in the Japanese Patent No. 2697555 and the JP-A 7658/1999, depth of the groove has been generally defined only in terms of wavelength λ of the reading beam mainly for the purpose of reducing the cross talk. The inventors of the present invention, however, have found that the relative track width $P_T/(\lambda/NA)$ is closely related to the cross talk, tilt margin and output. Based on such finding, in the present invention, the range of x defining the groove depth is limited in terms of $P_T/(\lambda/NA)$ to thereby reduce the cross talk and ensure the tilt margin as well as the output.

The present invention is also effective in reducing the cross erase, and in particular, in reducing the cross erase when the medium is recorded with a laser beam of short wave length. The reason for this is as described below.

The beam spot diameter λ/NA reduces with the decrease in the wavelength λ, and the energy density in the beam increases with the decrease in the wavelength λ. Accordingly, when the medium is recorded with a blue violet laser having a wavelength of approximately 400 nm, the recording layer is more likely to experience temperature elevation compared to the recording wherein a red laser having a wavelength of approximately 650 nm which is used in DVD-RAM or the like is used. Use of a short recording wavelength λ thus results in an increased occurrence of the cross erase even if the ratio T of the recording track pitch to the beam spot diameter was not so small.

One countermeasure which may be adopted for reducing the cross erase is increase of recording sensitivity. Investigation by the inventors of the present invention has revealed that decrease in the reflectivity of the medium is effective in the improving of the recording sensitivity. The decrease in the reflectivity, however, is generally accompanied with the decrease of the output. In addition, the output depends on the difference in reflectivity between the crystalline region and the amorphous record marks of the recording layer, and in the short wavelength region of around 400 nm, it is difficult to maintain the reflectivity difference at a level equivalent to the wavelength region of around 650 nm even by the optimization of the medium optical design. This also results in the decrease of the output, and hence, in the increase of the jitter.

In contrast, the output can be increased in the present invention by increasing x (by reducing the groove depth). When a medium is designed such that the reflectivity is to be reduced for the decrease of the cross erase, the output will also be reduced and the output will be reduced in short wavelength region. The decrease in the output is avoided in the present invention by controlling the x. Accordingly, a high density recording medium adapted for use with short wavelength laser can be designed wherein jitter increase due to decrease in the output is avoided and wherein the cross erase is simultaneously reduced.

It should be noted that, in the short wavelength region, and in particular, in the region wherein the wavelength is 200 to 450 nm, lower limit of x is preferably set at a larger value, namely, to meet the relation:

$$-12.6T+16.0 \leq x$$

since the output is likely to be low in such region. In addition, it is also preferable that the relation:

$$x \leq 25T-4.5$$

is met for the decrease of the cross erase in such short wavelength region. The cross erase is also likely to be increased in such short wavelength region as described above, and the T defining the degree of extension of the beam spot beyond the recording track is preferably such that:

$$0.56 \leq T.$$

An embodiment wherein the present invention is applicable is shown in FIG. 1. The optical recording medium shown in FIG. 1 is a single-side recording (single plate) medium comprising a light-transmitting substrate 2, and a first dielectric layer 31, a recording layer 4 of phase change type, a second dielectric layer 32, a reflective layer 5, and a protective layer 6 disposed on the light-transmitting substrate 2 in this order. It should be noted that the present invention is also applicable to a double-side recording medium wherein two such single-side recording mediums have been adhered with each other with the protective layer 6 in the inside by an intervening adhesive layer. The present invention is also applicable to a medium wherein such single-side recording medium has been adhered to a protective substrate with an intervening adhesive layer.

Light-Transmitting Substrate 2

In the optical recording medium of the present invention, the recording layer 4 is irradiated by the recording/reading beam which has passed through the light-transmitting substrate 2. Therefore, the light-transmitting substrate 2 preferably comprises a material substantially transparent to the recording/reading beam such as a resin or a glass. Exemplary resins which may be employed include acrylic resins, polycarbonate resins, epoxy resins, and polyolefins.

The light-transmitting substrate 2 is formed with the grooves 21 and the lands 22 between the adjacent grooves 21. When seen from the side of the light beam incidence (from the side of the light-transmitting substrate 2), the surface of the groove 21 is relatively nearer to the side of the light beam incidence compared to the surface of the land 22. Both the land 22 and the groove 21 are used as the recording track. The width of the groove and the land may be either the same or different. However, when the merits of the present invention are to be fully realized in both the groove and the land, the width $W_G$ of the groove 21 and the width $W_L$ of the land 22 are preferably designed such that:

$$0.3 \leq W_G/(W_L+W_G) \leq 0.7.$$

For the purpose of high density recording, the recording track pitch is preferably up to 0.7 μm, and more preferably up to 0.6 μm. It should be noted that the recording track pitch is (groove width+land width)/2.

The light-transmitting substrate 2 has a thickness of up to 0.8 mm, and preferably, a thickness in the range of 0.2 to 0.65 mm. An excessively thick light-transmitting substrate 2 results in reduced tilt margin while an excessively thin light-transmitting substrate 2 results in higher susceptibility to deformation, and hence, in increased error. Although the light-transmitting substrate is not limited for is shape, the light-transmitting substrate is typically formed in the shape of a disk having a diameter of about 50 to 360 mm.

It should be noted that, in the embodiment shown in FIG. 1, the light-transmitting substrate 2 comprises a resin plate or a glass plate having a thickness sufficient for retaining its shape with no support by other members. The present invention, however, is also applicable to an optical recording medium comprising a light-transmitting substrate with reduced thickness for the purpose of increasing the recording density. An embodiment of such thin light-transmitting substrate is shown in FIG. 2.

Figure 2:
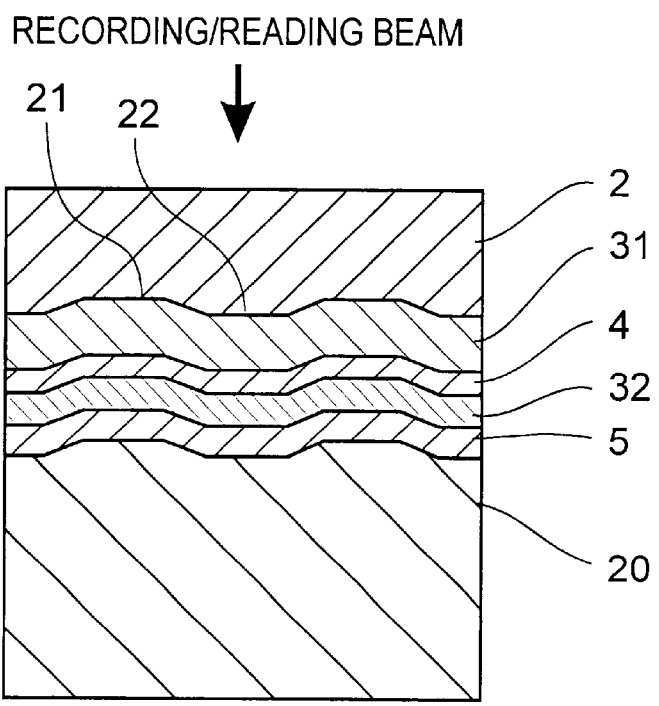
FIG. 2 is a cross sectional view of the optical recording medium according to another embodiment of the present invention.

The optical recording medium shown in FIG. 2 is a medium of single-side recording type comprising a supporting substrate 20, and a reflective layer 5, a second dielectric layer 32, a recording layer 4, a first dielectric layer 31, and a light-transmitting substrate 2 formed on the supporting substrate 20 in this order. The supporting substrate 20 of FIG. 2 comprises a resin plate or a glass plate having a thickness sufficient for retaining its shape with no support by other members as in the case of the light-transmitting substrate 2 of FIG. 1, and the supporting substrate 20 preferably has a thickness in the range of 0.2 to 1.6 mm, and more preferably, 0.4 to 1.2 mm. The order how the layers are disposed on the supporting substrate 20 from the reflective layer 5 to the first dielectric layer 31 is the same as the embodiment shown in FIG. 1 when seen from the side of the recording/reading beam incidence (from the side of the light-transmitting substrate 2).

The light-transmitting substrate 2 of FIG. 2 has a light transmittance sufficient for transmitting the recording/reading beam. For example, the light-transmitting substrate 2 may comprise a resin plate or a glass plate having a thickness substantially equivalent to that of the supporting substrate 20.

The present invention, however, is particularly effective when the NA of the recording/reading optical system is increased for realizing the high density recording. Accordingly, use of a thinner light-transmitting substrate 2 is preferable as in the case of the light-transmitting layer described in JP-A 7658/1999 as described above. In such a case, the thickness of the light-transmitting substrate 2 is preferably selected from the range of 30 to 300 μm. When the light-transmitting substrate 2 is too thin, unduly serious optical effects may be brought by the dust attached to the surface of the light-transmitting substrate 2. On the other hand, when the light-transmitting substrate 2 is too thick, recording at a higher recording density by the use of a higher NA will be difficult.

The thin light-transmitting substrate 2 may be provided, for example, by adhering a light-transmitting sheet comprising a light-transmitting resin on the first dielectric layer 31 by means of an adhesive, or by directly forming the light-transmitting resin layer on the first dielectric layer 31 by coating.

As in the case of FIG. 1, in the light-transmitting substrate 2 shown in FIG. 2, the surface of the groove 21 is also relatively nearer to the side of the recording/reading beam incidence compared to the surface of the land 22 when seen from the side of the light beam incidence. The land 22 and the groove 21 of the light-transmitting substrate 2 may be formed by providing a negative recess-and-projection pattern on the supporting substrate 20 and disposing the dielectric layers, the recording layer, and the light-transmitting substrate 2 such that the recess-and-projection pattern is transferred to the light-transmitting substrate 2.

First dielectric layer 31 and second dielectric layer 32

These dielectric layers prevent oxidation and degradation of the recording layer 4, and also, protect the supporting substrate 20 and the light-transmitting substrate 2 from the heat transmitted from the recording layer 4 during the recording by blocking the heat or by dissipating such heat in lateral direction of the layer. Provision of the dielectric layers also contributes for improving the degree of modulation. The dielectric layer 31 and the dielectric layer 32 may also comprise a laminate of two or more dielectric layers each having different compositions.

The dielectric material used in the dielectric layers may be a compound containing at least one metal component selected from Si, Ge, Zn, Al, and rare earth metals, and the material is preferably an oxide, a nitride, or a sulfide. A mixture containing two or more of the foregoing may also be used. Exemplary preferable materials are a mixture of zinc sulfide and silicon oxide ($ZnS$—$SiO_2$), aluminum nitride, and aluminum oxide. The thickness of the first and the second dielectric layers may be adequately determined so that sufficient improvement in the protection and degree of modulation are achieved. However, the first dielectric layer 31 is preferably deposited to a thickness of 30 to 300 nm, and more preferably, to a thickness of 50 to 250 nm, and the second dielectric layer 32 is preferably deposited to a thickness of 10 to 50 nm, and more preferably, to a thickness of 13 to 45 nm. The dielectric layers are preferably formed by sputtering.

Recording Layer 4

The recording layer is not particularly limited for its composition, and the material used may be adequately selected from various phase change recording materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Sb and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high effect in improving the storage reliability.

Preferably, the composition containing Sb and Te is the one as described below, namely, the composition represented by the formula (I):

$$(Sb_aTe_{1-a})_{1-b}M_b \qquad (I)$$

wherein M represents the element other than Sb and Te, and atomic ratio of the elements constituting the recording layer is preferably such that:

$0.2 \leq a \leq 0.90$, and $0 \leq b \leq 0.25$, and more preferably, $0.55 \leq a \leq 0.85$, and $0.01 \leq b \leq 0.20$.

When "a" representing the content of Sb is too small in the above formula, crystallization speed will be excessively low and the overwriting will be difficult. In addition, when "a" is too small, reflectivity of the recording layer in the crystalline region will be insufficient, and the output of the output signal will be low. When "a" is extremely low, recording will be difficult. On the other hand, when "a" is too large, difference in reflectivity between the crystalline phase and the amorphous phase will be insufficient.

The element M is not particularly limited. However, it is preferable to select at least one member from the above-indicated elements for the M in view of storage reliability. The "b" representing the content of the element M is preferably within the above-specified range since an excessively large "b" results in the reduced crystallization speed.

The recording layer is preferably formed to a thickness of more than 4 nm to 50 nm, and more preferably, to a thickness of 5 nm to 30 nm. When the recording layer is too thin, transformation into the crystalline phase will be difficult and the reflectance difference created by the phase change will be insufficient. When the recording layer is too thick, the recording layer will have an increased heat capacity to render the recording difficult. An excessively thick recording layer also results in the reduced output signal.

The recording layer is preferably formed by sputtering.

Reflective Layer 5

The reflective layer 5 may be formed from any desired material, and typically, the reflective layer 5 is formed from a metal of high reflectivity such as Al, Au, Ag, Pt, or Cu as a simple substance or as an alloy containing at least one of such metals. The reflective layer is preferably formed by vapor deposition such as sputtering and evaporation.

Protective Layer 6

The protective layer 6 is provided for improving scratch resistance and corrosion resistance. Preferably, the protective layer is formed from an organic material, and typically, from a radiation curable compound or a composition thereof which has been cured with radiation such as electron beam or UV radiation. The protective layer is generally about 0.1 to about 100 μm thick and may be formed by conventional techniques such as spin coating, gravure coating, spray coating, and dipping.

Adhesive Layer

An adhesive layer is provided when the embodiment shown in FIG. 1 is used in producing an optical recording medium for double-side recording. The adhesive used for the adhesive layer is not particularly limited, and exemplary such adhesives include hot melt adhesives, UV curable adhesives, room temperature curable adhesives, and pressure-sensitive adhesives.

Others

The wavelength λu of the laser beam used for the recording/reading is not limited. The wavelength λu, however, is preferably $\lambda u \leq 680 nm$ since the present invention is directed to a medium recorded at a high density. In addition, in view of the effectiveness of the present invention in reducing the cross erase in the short wavelength region as described above, such effect is particularly significant when the wavelength λu is $\lambda u \leq 450 nm$.

There is no particular lower limit for the λu. However, use of the laser with an extremely short wavelength is practically difficult, and the wavelength λu is typically $\lambda u \geq 200 nm$.

The numerical aperture NA of the reading optical system is not particularly limited. An excessively small numerical aperture, however, invites difficulty in reading the high density recording medium. In addition, the present invention is particularly effective for use with a reading optical system wherein the tilt margin is narrow, namely, wherein the numerical aperture NA is large. Accordingly, the optical recording medium of the present invention is effective when the NA of the reading optical system is $NA \geq 0.6$, and in particular, when the NA is $NA \geq 0.65$.

It should be noted that the present invention is applicable to any optical recording medium as long as the medium is recorded by land/groove recording system. However, as evident from the operation and effects of the present invention as described above, the present invention is particularly advantageous when it is applied to a phase change optical recording medium.

EXAMPLES

Example 1

Samples of the optical recording disk having the constitution as shown in FIG. 1 were produced by the procedure as described below.

The light-transmitting substrate 2 was formed by injection molding a polycarbonate in the shape of a disk having a diameter of 120 mm and a thickness of 0.6 mm. Grooves were formed simultaneously with the injection molding. The groove width and the land width were the same, and T and x as described above were set at the values shown in Table 1.

The first dielectric layer 31 was formed by sputtering in argon atmosphere using ZnS (80 mole %)—SiO$_2$ (20 mole %) for the target. The first dielectric layer was formed to a thickness of 235 nm.

The recording layer 4 was formed by sputtering. The recording layer had a composition (atomic ratio) of $Ag_6In_4Sb_{63}Te_{27}$ The recording layer was formed to a thickness of 15 nm.

The second dielectric layer 32 was formed by a manner similar to that of the first dielectric layer. The second dielectric layer was formed to a thickness of 25 nm.

The reflective layer 5 was formed by sputtering in argon atmosphere using Al-1.7 mole % Cr alloy for the target. The reflective layer 5 was formed to a thickness of 100 nm.

The protective layer 6 was formed by applying a UV curable resin by spin coating and exposing it to UV for curing. The protective layer as cured had a thickness of 5 μm.

The thus produced samples were initialized by a bulk eraser. The initialized samples were evaluated for jitter under non-tilted conditions, tilt margin, and output using an optical recording medium evaluator under the conditions as described below. The tilt margin is the range of tilt angle within which the jitter does not exceed 15%. The results are shown in Table 1. In Table 1, the tilt margin of less than 0.80° and the jitter in excess of 10% are marked as the value outside the preferable range.

Measurement Conditions wavelength λ: 634 nm, numerical aperture, NA: 0.6, linear velocity: 3.5 m/s, recording signal: 8–16 modulated signal, reading power: 0.9 mW, and recording power and erasing power: the value at which jitter is minimized in each sample

TABLE 1

| Sample No. | T | x | Tilt Margin (±deg) | Jitter (%) | Output (V) | Cross talk (dB) |
| --- | --- | --- | --- | --- | --- | --- |
| 1 (Comp.) | 0.61 | 7.5** | 0.78* | 10.1* | 0.78 | −29.0 |
| 2 | 0.61 | 8.0 | 0.80 | 9.4 | 0.85 | −28.0 |
| 3 | 0.61 | 10.0 | 0.80 | 9.9 | 0.87 | −27.5 |
| 4 (Comp.) | 0.61 | 11.5** | 0.76* | 10.3* | 0.88 | −26.0 |
| 5 (Comp.) | 0.63 | 7.0** | 0.84 | 10.3* | 0.81 | −29.3 |
| 6 | 0.63 | 8.0 | 0.86 | 9.1 | 0.90 | −28.1 |
| 7 | 0.63 | 10.0 | 0.82 | 9.3 | 0.91 | −28.0 |
| 8 | 0.63 | 11.0 | 0.80 | 9.4 | 0.90 | −27.4 |
| 9 (Comp.) | 0.63 | 12.0** | 0.74* | 10.1* | 0.92 | −26.5 |
| 10 (Comp.) | 0.65 | 7.0** | 0.89 | 10.1* | 0.87 | −29.5 |
| 11 | 0.65 | 8.0 | 0.90 | 9.0 | 0.93 | −28.5 |
| 12 | 0.65 | 10.0 | 0.86 | 9.2 | 0.92 | −28.3 |
| 13 | 0.65 | 12.0 | 0.82 | 9.6 | 0.93 | −28.0 |
| 14 (Comp.) | 0.65 | 12.5** | 0.78* | 9.8 | 0.92 | −26.0 |

**a value outside the claimed scope
*a value outside the preferable range

The results shown in Table 1 demonstrate the merits of the present invention. Use of the T and the x within the scope of the present invention has realized high output as well as low cross talk, and the jitter is thereby reduced and the tilt margin is sufficiently widened. It should be noted that the tilt margin narrower than the preferable range of Sample No. 1 is due to the jitter which was already high in the non-tilted state.

Example 2

Samples of the optical recording disk having the constitution as shown in FIG. 2 were produced by the procedure as described below.

The supporting substrate 20 was formed by injection molding a polycarbonate in the shape of a disk having a diameter of 120 mm and a thickness of 1.1 mm. On the surface of the supporting substrate was formed a recess-and-projection pattern which corresponds to the grooves and lands of the light-transmitting substrate after its transcription to the light-transmitting substrate 2. The groove width and the land width were the same, and T and x as described above were set at the values shown in Table 2.

The reflective layer 5 was formed by sputtering in argon atmosphere using $Ag_{98}Pd_1Cu_1$ for the target. The reflective layer 5 was formed to a thickness of 100 nm.

The second dielectric layer 32 was formed by sputtering in argon atmosphere using $Al_2O_3$ for the target. The second dielectric layer was formed to a thickness of 25 nm.

The recording layer 4 was formed by sputtering in argon atmosphere using an alloy target. The recording layer had a composition (atomic ratio) of

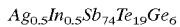

$Ag_{0.5}In_{0.5}Sb_{74}Te_{19}Ge_6$

The recording layer was formed to a thickness of 12 nm.

The first dielectric layer 31 was formed by sputtering in argon atmosphere using ZnS (80 mole %)—$SiO_2$ (20 mole %) for the target. The first dielectric layer was formed to a thickness of 130 nm.

The light-transmitting substrate 2 was disposed on the surface of the first dielectric layer 31 by adhering a polycarbonate sheet of 100 μm thick to the first dielectric layer 31 with an intervening adhesive layer of 3 μm thick comprising a solvent-base, UV curable acrylic resin.

The thus produced samples were initialized by a bulk eraser and evaluated for the same items as Example 1 under the conditions as described below. The results are shown in Table 2.

Measurement Conditions wavelength λ: 405 nm, numerical aperture, NA: 0.85, linear velocity: 6.5 m/s, recording signal: (1,7)RLL, reading power: 0.3 mW, and recording power and erasing power: the value at which the jitter is minimized in each sample

TABLE 2

| Sample No. | T | x | Tilt Margin (±deg) | Jitter (%) | Output (V) | Cross talk (dB) |
| --- | --- | --- | --- | --- | --- | --- |
| 15 (Comp.) | 0.63 | 7.3** | 0.80 | 10.3* | 0.310 | −27.0 |
| 16 | 0.63 | 8.0 | 0.82 | 10.0 | 0.320 | −26.5 |
| 17 | 0.63 | 8.5 | 0.85 | 9.1 | 0.335 | −26.3 |
| 18 | 0.63 | 10.3 | 0.83 | 9.2 | 0.345 | −24.5 |
| 19 | 0.63 | 11.5 | 0.81 | 10.0 | 0.347 | −23.9 |
| 20 (Comp.) | 0.63 | 12.0** | 0.78* | 10.5* | 0.350 | −23.5 |

TABLE 2-continued

| Sample No. | T | x | Tilt Margin (±deg) | Jitter (%) | Output (V) | Cross talk (dB) |
| --- | --- | --- | --- | --- | --- | --- |
| 21 (Comp.) | 0.67 | 7.0** | 0.80 | 10.3* | 0.320 | −29.0 |
| 22 | 0.67 | 7.5 | 0.86 | 10.0 | 0.330 | −28.6 |
| 23 | 0.67 | 10.3 | 0.85 | 9.2 | 0.360 | −27.4 |
| 24 | 0.67 | 12.5 | 0.81 | 10.0 | 0.385 | −26.4 |
| 25 (Comp.) | 0.67 | 13.2** | 0.78* | 10.9* | 0.400 | −26.0 |

**a value outside the claimed scope
*a value outside the preferable range

The results shown in Table 2 reveal that the merits of the present invention are realized even when the recording/reading beam has a short wavelength.

Example 3

Samples of the optical recording disk were produced by repeating the procedure of Example 2 except that the T and the x were set at the values shown in Table 3 and the reflectivity was adjusted to the values shown in Table 3 by altering thickness of the first dielectric layer 31.

The samples were evaluated for their output, jitter, and cross erase. The results are shown in Table 3. The jitter and the cross erase were evaluated by the procedure as described below.

First, the track to be evaluated was recorded with 8T signal, and the carrier output was measured (C1). Next, the adjacent tracks on opposite sides of the track to be evaluated were overwritten with 7T signal for 10 times. The carrier output of the 8T signal that had been first recorded on the track to be evaluated was then evaluated (C2). (C2−C1) is the cross erase shown in Table 3.

The jitter shown in Table 3 was evaluated by recording signals in the track to be evaluated, overwriting the adjacent tracks on opposite sides of the track to be evaluated for 10 times, and then evaluating the jitter for the signals that had been recorded at first on the track to be evaluated. In other words, the jitter evaluated is a value including the effects of the cross erase. It should be noted that the jitter was also evaluated in Examples 1 and 2 by the same procedure.

TABLE 3

| Sample No. | Reflectivity (%) | T | x | Output (V) | Cross erase (dB) | Jitter (%) |
| --- | --- | --- | --- | --- | --- | --- |
| 26 (Comp.) | 15.0 | 0.67 | 6.4** | 0.250 | −0.8 | 11.0* |
| 27 (Comp.) | 12.0 | 0.67 | 6.4** | 0.204 | −0.5 | 10.8* |
| 28 | 15.0 | 0.67 | 8.5 | 0.300 | −1.2 | 10.0 |
| 29 | 12.0 | 0.67 | 8.5 | 0.254 | −0.9 | 9.5 |

**a value outside the claimed scope
*a value outside the preferable range

As demonstrated in Table 3, the cross erase could be reduced by reducing the reflectivity irrespective of whether x was 6.4 or 8.5. However, when x was 6.4 which is a value below the scope of the present invention, the output was low, and the jitter including the influence of the cross erase exceeded 10% although decrease in the cross erase realized by reducing the reflectivity was equivalent to the sample wherein x was 8.5. In contrast, in the samples wherein x was 8.5, the groove was shallow and the output was sufficiently high, and the jitter including the effect of the cross erase was suppressed to up to 10%.

MERITS OF THE INVENTION

In the present invention, the value x defining the groove depth λ/(x·n) is limited by using T which is the ratio of the recording track pitch $P_T$ to the beam spot diameter $\lambda/NA$ of the reading beam, and the value T is simultaneously limited. This enables production of an optical recording medium of land/groove recording system wherein the tilt margin is sufficiently widened and the cross talk is sufficiently reduced, and also, wherein the output is sufficiently increased. Also produced is a medium wherein the cross erase and the jitter are reduced.

Japanese Patent Application Nos. 42953/2000 and 309955/2000 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium having a light-transmitting substrate formed with grooves wherein the grooves and the region between adjacent grooves are used for the recording track, and a reading beam is irradiated through the light-transmitting substrate, wherein the relations:

$-12.6T+15.6 \leq x \leq 25T-3.8$, and $0.55 \leq T \leq 0.68$ are satisfied when the reading beam has a wavelength of $\lambda$, the light-transmitting substrate has a refractive index at the wavelength $\lambda$ of n, the reading optical system has a numerical aperture of NA, recording track pitch is $P_T$, the groove has a depth of $\lambda/(x \cdot n)$, and T is $P_T/(\lambda/NA)$.

2. An optical recording medium according to claim 1 wherein said medium is used in combination with a reading optical system wherein $NA \geq 0.6$.

3. A method for designing an optical recording medium having a light-transmitting substrate formed with grooves wherein the grooves and the region between adjacent grooves are used for the recording track, and a reading beam is irradiated through the light-transmitting substrate, wherein the groove is designed to have a depth satisfying the relations:

$-12.6T+15.6 \leq x \leq 25T-3.8$, and $0.55 \leq T \leq 0.68$ when the reading beam has a wavelength of $\lambda$, the light-transmitting substrate has a refractive index at the wavelength $\lambda$ of n, the reading optical system has a numerical aperture of NA, recording track pitch is $P_T$, the groove has a depth of $\lambda/(x \cdot n)$, and T is $P_T/(\lambda/NA)$.

4. A method for designing an optical recording medium according to claim 3 wherein the medium is designed by assuming that:

$NA \geq 0.6$.

* * * * *

UNITED STATES PATENT AND TRADEMARK OFFICE
CERTIFICATE OF CORRECTION

PATENT NO. : 6,618,349 B2
DATED : September 9, 2003
INVENTOR(S) : Inoue et al.

It is certified that error appears in the above-identified patent and that said Letters Patent is hereby corrected as shown below:

Title page,
Item [*] Notice, should read:
-- [*] Notice: Subject to any disclaimer, the term of this patent is extended or adjusted under 35 U.S.C. 154(b) by 408 days. --.

Signed and Sealed this

Sixth Day of September, 2005

JON W. DUDAS
*Director of the United States Patent and Trademark Office*